(12) United States Patent
Yuan et al.

(10) Patent No.: US 9,991,664 B1
(45) Date of Patent: Jun. 5, 2018

(54) HIGH-EFFICIENCY HIGH-POWER RING LASER AMPLIFIER

(71) Applicant: SOOCHOW UNIVERSITY, Suzhou (CN)

(72) Inventors: Xiao Yuan, Suzhou (CN); Tiancheng Yu, Suzhou (CN); Xiang Zhang, Suzhou (CN); Fan Gao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days. days.

(21) Appl. No.: 15/707,196

(22) Filed: Sep. 18, 2017

(30) Foreign Application Priority Data

Nov. 16, 2016 (CN) .......................... 2016 1 1006380

(51) Int. Cl.
| | |
|---|---|
| H01S 3/00 | (2006.01) |
| H01S 3/083 | (2006.01) |
| H01S 3/102 | (2006.01) |
| H01S 3/067 | (2006.01) |
| H01S 3/034 | (2006.01) |
| H01S 3/10 | (2006.01) |
| H01S 3/23 | (2006.01) |

(52) U.S. Cl.
CPC .......... *H01S 3/083* (2013.01); *H01S 3/0071* (2013.01); *H01S 3/034* (2013.01); *H01S 3/06712* (2013.01); *H01S 3/1024* (2013.01); *H01S 3/10061* (2013.01); *H01S 3/23* (2013.01); *H01S 3/2308* (2013.01)

(58) Field of Classification Search
CPC ........... H01S 3/083; H01S 3/23; H01S 3/2308
USPC ........................................................ 359/333
See application file for complete search history.

(56) References Cited

U.S. PATENT DOCUMENTS

| | | | | |
|---|---|---|---|---|
| 5,644,424 A | * | 7/1997 | Backus ................. | H01S 3/2325 359/347 |
| 2008/0069157 A1 | * | 3/2008 | Ariga ..................... | H01S 3/2308 372/21 |
| 2016/0064893 A1 | * | 3/2016 | Bhawalkar ............ | H01S 3/1301 359/337 |

\* cited by examiner

*Primary Examiner* — Mark Hellner
(74) *Attorney, Agent, or Firm* — SZDC Law P.C.

(57) ABSTRACT

A high-efficiency high-power ring laser amplifier includes four polarizers, four amplifiers, fours lens, two filter apertures, two electro-optic switches, a mirror, a wavefront corrector. A bidirectional ring laser amplifier configuration with twin pulses is suitable for any type of gain media and pumping configurations. This amplifier configuration can effectively improve the extraction efficiency of the gain medium. The amplification configuration proposed by the present invention patent can realize the ring amplification for any number of rounds in principle, and can effectively control quality of the output laser beam and relax the restriction on the injected energy. The two spatial filters in the novel high-efficiency high-power ring laser amplifier of the present invention patent can effectively removing the spatial modulations in the laser beams, and the first and second spatial filters reimage the beam at wavefront corrector to mirror which can effectively inhibit the diffraction effect.

11 Claims, 1 Drawing Sheet

HIGH-EFFICIENCY HIGH-POWER RING LASER AMPLIFIER

This application claims priority to Chinese Patent Application No.: 201611006380.5, filed on Nov. 16, 2016, which is incorporated by reference for all purposes as if fully set forth herein.

FIELD OF THE INVENTION

The present invention relates to a laser amplifier, and more particularly to a novel high-efficiency high-power ring laser amplifier.

BACKGROUND OF THE INVENTION

Following the MOPA (Master Oscillator Power Amplifier) technology, a new generation of laser technology, represented by multipass amplification, has greatly promoted the development of high-power laser devices, but there are still many problems. First, in order to extract the energy in the medium, prior designs required expensive pre-amplifier system, as greater front-end energy has been utilized to compensate for the limited gain of the main amplifier system; second, in order to isolate ASE, an off-axis design is required in prior designs, which leads to the vignetting losses; third, in the prior art devices, the variable-aperture single-pulse unidirectional transmission amplification is usually used, with the amplifier having a low stored-energy extraction efficiency; fourth, the whole system is complex and bulky, costly, and high in the maintenance costs.

Therefore, it is necessary to propose a novel laser amplifier configuration, so as to solve the existing problems of the prior art laser amplifier.

CONTENTS OF THE INVENTION

A purpose of the present invention is to provide a novel high-power laser ring amplification configuration, so as to solve the above-mentioned problems in the prior art.

In order to attain the above purpose, the present invention adopts the following technical solution:

a novel high-efficiency high-power ring laser amplifier is provided, comprising:

a first polarizer, used for passing the pulses having a polarization state aligned with a first polarization axis, and reflecting the pulses having a polarization state aligned with a second polarization axis;

a first amplifier, used for amplifying the laser pulses in the ring laser amplifier;

a first electro-optic switch, used for rotating the polarization state of laser pulses;

a first spatial filter, composed of a first lens, a second lens, and a first filter aperture, used for removing spatial modulations in the laser beams;

a second amplifier, used for amplifying the laser pulses in the ring laser amplifier;

a second polarizer, used for passing the pulses having a polarization state aligned with a first polarization axis, and reflecting the pulses having a polarization state aligned with a second polarization axis;

a wavefront corrector, used for correcting beam wavefront;

a third polarizer, used for passing the pulses having a polarization state aligned with a first polarization axis, and reflecting the pulses having a polarization state aligned with a second polarization axis;

a third amplifier, used for amplifying the laser pulses in the ring laser amplifier;

a second electro-optic switch, used for rotating the polarization state of laser pulses;

a second spatial filter, composed of a third lens, a fourth lens, and a second filter aperture, used for removing spatial modulations in the laser beams;

a fourth amplifier, used for amplifying the laser pulses in the ring laser amplifier;

a fourth polarizer, used for passing the pulses having a polarization state aligned with a first polarization axis, and reflecting the pulses having a polarization state aligned with a second polarization axis; and a mirror, composing a ring cavity together with the four polarizers and the wavefront corrector, so that the two injected pulses transmit ring amplification in the opposite direction under the same conditions.

Preferably, the first and second spatial filters reimage the beam at wavefront corrector to mirror, and vice versa.

Preferably, the total length of the ring cavity matches the pulse width of the incident pulse.

Preferably, the first and second electro-optical switches are positioned anywhere in the ring cavity, and the distance of electro-optical switches is longer than the distance traveled by light during pulse width.

Preferably, the first and second electro-optic switches use either Pockels cells or other polarization control devices.

Preferably, the first and second electro-optic switches operate in either a boost mode or a depressurized mode.

Preferably, the first, second, third and fourth polarizers are either polarizers or polarization beam splitters, or other polarization components.

Preferably, the first, second, third and fourth amplifiers are suitable for many different types of gain media, possible gain media include gain media suitable for virtually any solid-state, liquid, or gas laser, and the amplifiers are configured in many pumping configurations.

Preferably, the first, second, third and fourth amplifiers can be positioned anywhere in the ring cavity and can adjust relevant parameters of the gain medium such as gain, number, length and size so as to meet requirements of output capability.

Preferably, the wavefront corrector can be replaced with deformable mirror, mirror, adaptive optics or other reflective optical element.

Preferably, the reflector can be replaced with a deformable mirror, adaptive optics or other reflective optical element.

The present invention patent has the following advantages:

1. The present invention patent discloses a bidirectional ring laser amplifier configuration with twin pulses, which is suitable for any type of gain media and pumping configurations. This amplifier configuration can effectively improve the extraction efficiency of the gain medium.

2. The amplification configuration proposed by the present invention patent can realize the ring amplification for any number of rounds in principle, and can effectively control quality of the output laser beam and relax the restriction on the injected energy.

3. The two spatial filters in the novel high-efficiency high-power ring laser amplifier of the present invention patent can effectively removing the spatial modulations in the laser beams, and the first and second spatial filters reimage the beam at wavefront corrector to mirror which can effectively inhibit the diffraction effect.

4. The present invention adopts an annular structure to make the amplifier structure more compact.

BRIEF DESCRIPTION OF THE DRAWINGS

In order to explain the examples of the present invention or the technical solutions of the prior art more clearly, the drawings to be used in the examples or the prior art will be briefly introduced.

Figure 1:
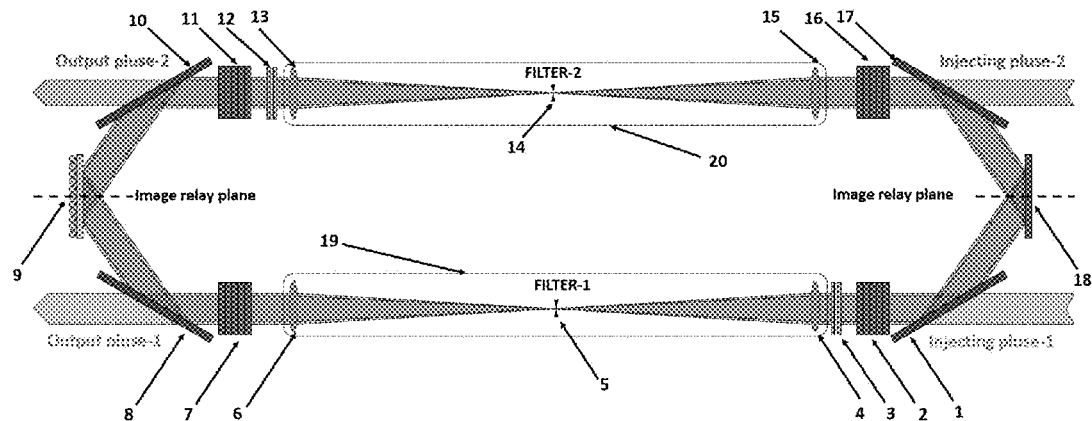
FIG. 1 is a schematic structural view of the high-efficiency high-power ring laser amplifier according to Example 1 of the present invention.
Figure 2:
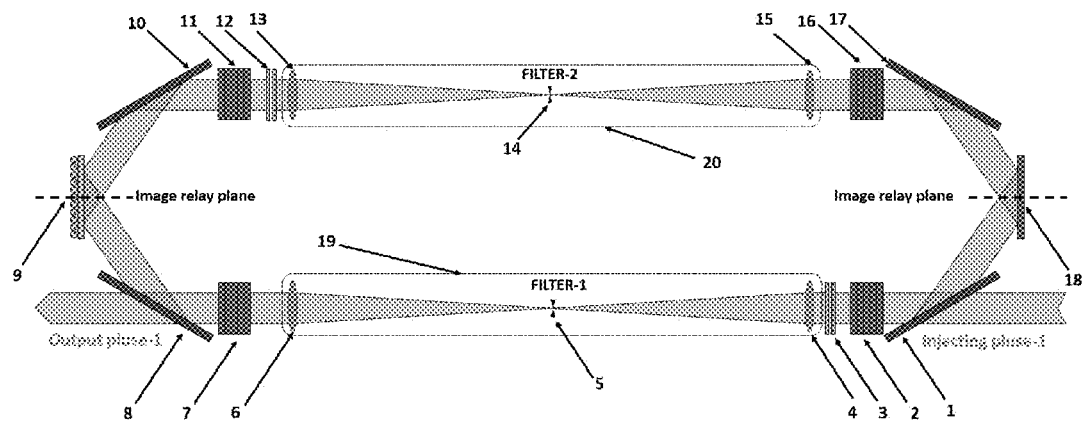
FIG. 2 is a schematic structural view of the high-efficiency high-power ring laser amplifier according to Example 2 of the present invention.

The names of the corresponding parts represented by numbers or letters in FIGS. 1-2: 1. A first polarizer; 2. a first amplifier; 3. a first electro-optic switch; 4. a first lens; 5. a first filter aperture; 6. a second lens; 7. a second amplifier; 8. a second polarizer; 9. a wavefront corrector; 10. a third polarizer; 11. a third amplifier; 12. a second electro-optic switch; 13. a third lens; 14. a second filter aperture; 15. a fourth lens; 16. a fourth amplifier; 17. a fourth polarizer; 18. a mirror; 19. a first spatial filter; and 20. a second spatial filter.

DETAILED DESCRIPTION OF THE EMBODIMENTS

In order to make the purpose, technical solutions and advantages of the present invention clearer, the present invention will be further explained in detail with reference to drawings and examples.

Example 1

As shown in FIG. 1, Example 1 of the present invention provides an amplification scheme of a ring laser amplifier with twin pulses, which can achieve the highest stored-energy extraction efficiency of the amplification medium in the case of the maximum output energy. The novel high-efficiency high-power ring laser amplifier comprises four polarizers, four amplifiers, four lenses, two filter apertures, two electro-optical switches, one wavefront corrector, and one mirror.

Referring to FIG. 1, the first input beam, which is polarized in a first polarization state (e.g., a linearly-polarized state), is transmitted through the first polarizer 1, which has a transmission axis aligned with the first polarization state. In the same way, the second input beam, which is polarized in a first polarization state (e.g., a linearly-polarized state), is transmitted through the fourth polarizer 17, which has a transmission axis aligned with the first polarization state. Thus polarizers 1 and 17 are aligned to pass light having a polarization state aligned with the first polarization axis, which, in the illustrated embodiment, is the p-polarization. As will be evident to one of skill in the art, the intensity of the beam propagated through the polarizer can be adjusted by rotating the axis of the polarization state of the input beam with respect to the transmission axis of the polarizer, or vice-versa. One of ordinary skill in the art would recognize many variations, modifications, and alternatives. After passing through the first polarizer 1, the first beam is amplified by the first amplifier 2, also referred to as an optical gain element, and the second beam is amplified by amplifier 16. Then the first beam is incident on the first electro-optic switch 3. Initially, the first electro-optic switch 3 has high voltage applied. Application of high voltage to the first electro-optic switch 3 can be referred to as having the electro-optic switch operated in a second state or an on-state. When operated in this second state, the laser beams incident on the electro-optic switch that is aligned with the first polarization axis (i.e., the p-polarization) will be transmitted through the first electro-optic switch 3, the polarization of the beams is rotated from the p-polarization state to the s-polarization state. The first input beam passes through a first spatial filter 19, which includes a first lens 4, a first pinhole spatial filter 5, and a second spherical lens 6. And the second input beam pass through a second spatial filter 20 after transmitting through the fourth amplifier 16 at the same time. The second input beam is incident on the second electro-optic switch 12. Initially, the second electro-optic switch 12 has high voltage applied the polarization of the second beam is rotated from the p-polarization state to the s-polarization state. Then, the first and second input beams propagate to amplifiers 7 and 11, respectively. The first input beam is then incident on the second polarizer 8, which is oriented so that the transmission axis is aligned with the first polarization axis (i.e., aligned to pass the p-polarization and to reflect the s-polarization). Because of the polarization rotation experienced passing through the first electro-optic switch 3, the first input beam is reflected by the second polarizer 8, and then is reflected from wavefront corrector 9 and the third polarizer 10. At the same time, the second input beam with s-polarization is reflected from the third polarizer 10 which is oriented with the transmission axis aligned with the polarization state of the initial input light (i.e., the p-polarization) and then is reflected from wavefront corrector 9 and the second polarizer 8. After transmitting through the third amplifier 11 and the second electro-optic switch 12 which has zero voltage applied, the first input beam passes through the second spatial filter 20. And the second input beam passes through the first spatial filter 19 after transmitting through the second amplifier 7 at the same time, then pass through first electro-optic switch 12 which has zero voltage applied. The first and second input beams then propagate to amplifiers 16 and 2, respectively. The first input beam with s-polarization is reflected by the fourth polarizer 17, and then is reflected from mirror 18 and the first polarizer 1. At the same time, the second input beam with s-polarization is reflected from the first polarizer 1, and then is reflected from mirror 18 and the fourth polarizer 17. While the electro-optic switches have zero voltage applied, the beams are trapped in the closed loop cavity since the polarization is still in the s-polarization. As illustrated in FIG. 1 the beams make a predetermined number of round trips through the closed loop and are amplified on each round trip. On the last pass, the controller changes the operating state of electro-optic switches 3 and 12 to the second state (i.e., the "on" state at high voltage) and the beams pass through electro-optic switches 3 and 12 with polarization rotating 90°. The first input beam is amplified by the first amplifier 2, is transmitted through the first spatial filter 19, further amplified by the second amplifier 7, and is then transmitted through the second polarizer 8 since the p-polarized beam is aligned with the transmission axis of the polarizer. The second input beam is amplified by the fourth amplifier 16, is transmitted through the second spatial filter 20, is further amplified by the third amplifier 11, and is then transmitted through the third polarizer 10 since the p-polarized beam is aligned with the transmission axis of the polarizer.

Example 2

As shown in FIG. 2, Example 2 of the present invention provides a ring laser amplifier with single pulses, which can obtain the maximum energy output. The ring laser amplifier comprises four polarizers, four amplifiers, four lenses, two filter apertures, two electro-optical switches, one wavefront corrector, and one mirror.

Referring to FIG. 2, the input beam, which is polarized in a first polarization state (e.g., a linearly-polarized state), is transmitted through the first polarizer 1, which has a transmission axis aligned with the first polarization state. Thus the first polarizer 1 is aligned to pass light having a polarization state aligned with the first polarization axis, which, in the illustrated embodiment, is the p-polarization. As will be evident to one of skill in the art, the intensity of the beam propagated through the polarizer can be adjusted by rotating the axis of the polarization state of the input beam with respect to the transmission axis of the polarizer, or vice-versa. One of ordinary skill in the art would recognize many variations, modifications, and alternatives. After passing through the first polarizer 1, the beam is amplified by the first amplifier 2, also referred to as an optical gain element. Initially, the first electro-optic switch 3 has high voltage applied. Application of high voltage to the first electro-optic switch 3 can be referred to as having the electro-optic switch operated in a second state or an on-state. When operated in this second state, the laser beams incident on the electro-optic switch that is aligned with the first polarization axis (i.e., the p-polarization) will be transmitted through the first electro-optic switch 3, the polarization of the beams is rotated from the p-polarization state to the s-polarization state. The first input beam passes through a first spatial filter 19, which includes a first lens 4, a first pinhole spatial filter 5, and a second spherical lens 6. Then, the beam propagates to the second amplifiers 7, respectively. The beam is then incident on the second polarizer 8, which is oriented so that the transmission axis is aligned with the first polarization axis (i.e., aligned to pass the p-polarization and to reflect the s-polarization). Because of the polarization rotation experienced passing through the first electro-optic switch 3, the beam is reflected by the second polarizer 8, and then is reflected from wavefront corrector 9 and the third polarizer 10. After transmitting through the third amplifier 11 and the second electro-optic switch 12 which has zero voltage applied, the beam passes through the second spatial filter 20. The beam then propagates to the fourth amplifiers 16. The beam with s-polarization is reflected by the fourth polarizer 17, and then is reflected from mirror 18 and the first polarizer 1.

While the electro-optic switches have zero voltage applied, the beams are trapped in the closed loop cavity since the polarization is still in the s-polarization. As illustrated in FIG. 2 the beam makes a predetermined number of round trips through the closed loop and is amplified on each round trip. On the last pass, the controller changes the operating state of the first electro-optic switch 3 to the second state (i.e., the "on" state at high voltage) and the beam passes through the first electro-optic switch 3 with polarization rotating 90°. The beam is amplified by the first amplifier 2, is transmitted through the first spatial filter 19, further amplified by the second amplifier 7, and is then transmitted through the second polarizer 8 since the p-polarized beam is aligned with the transmission axis of the polarizer. In some implementations, to reduce diffraction effects, the first and second spatial filters reimage the beam at deformable mirror to mirror, and vice versa. The total length of the ring cavity matches the pulse width of the incident laser pulses.

In some implementations, the first and second electro-optical switches can be positioned anywhere in the ring cavity, and the distance of electro-optical switches is longer than the distance traveled by light during pulse width. The electro-optic switches can also be replaced with Pockels cells and other polarization devices. The electro-optic switches can be operated in either a boost mode or a bulk mode.

In some implementations, the first, second, third and fourth amplifiers are suitable for many different types of gain media, possible gain media include gain media suitable for virtually any solid-state, liquid, or gas laser, and the amplifiers can be configured in many pumping configurations. The amplifiers can also be positioned anywhere in the ring cavity and can adjust relevant parameters of the gain medium such as gain, number, length and size to meet requirements of output capability.

In some implementations, the first, second, third and fourth polarizers can be replaced with polarization beam splitters or other polarization components. The deformable mirror can be replaced with mirror, adaptive optics and other reflective optical element. The mirror can be replaced with deformable mirror, adaptive optics and other reflective optical element.

The above two examples are used only for explaining the technical concept and characteristics of the present invention, They are provided to make those skilled in the art understand the present invention and implement it, instead of limiting the scope of protection of the present invention. Any modification made according to the spiritual substance of the main technical solution of the present invention will all fall within the scope of protection of the present invention.

What is claimed is:

1. A high-efficiency high-power ring laser amplifier, characterized in that: it comprises:
    a first polarizer (1), used for passing the pulses having a polarization state aligned with a first polarization axis, and reflecting the pulses having a polarization state aligned with a second polarization axis;
    a first amplifier (2), used for amplifying the laser pulses in the ring laser amplifier;
    a first electro-optic switch (3), used for rotating the polarization state of laser pulses;
    a first spatial filter (19), composed of a first lens (4), a second lens (6), and a first filter aperture (5), used for removing spatial modulations in the laser beams;
    a second amplifier (7), used for amplifying the laser pulses in the ring laser amplifier;
    a second polarizer (8), used for passing the pulses having a polarization state aligned with a first polarization axis, and reflecting the pulses having a polarization state aligned with a second polarization;
    a wavefront corrector (9), used for correcting beam wavefront;
    a third polarizer (10), used for passing the pulses having a polarization state aligned with a first polarization axis, and reflecting the pulses having a polarization state aligned with a second polarization;
    a third amplifier (11), used for amplifying the laser pulses in the ring laser amplifier;
    a second electro-optic switch (12), used for rotating the polarization state of laser pulses;
    a second spatial filter (20), composed of a third lens (13), a fourth lens (15), and a second filter aperture (14), used for removing spatial modulations in the laser beams;
    a fourth amplifier (16), used for amplifying the laser pulses in the ring laser amplifier;

a fourth polarizer (17), used for passing the pulses having a polarization state aligned with a first polarization axis, and reflecting the pulses having a polarization state aligned with a second polarization; and a mirror (18), composing a ring cavity together with the four polarizers (1), (8), (10), (17) and the wavefront corrector (9), so that the two injected pulses transmit ring amplification in the opposite direction under the same conditions.

2. The high-efficiency high-power ring laser amplifier according to claim 1, characterized in that: the spatial filters (19) and (20) reimage the beam at wavefront corrector (9) to mirror (18), and vice versa.

3. The high-efficiency high-power ring laser amplifier according to claim 1, characterized in that: the total length of the ring cavity matches the pulse width of the incident pulse.

4. The high-efficiency high-power ring laser amplifier according to claim 1, characterized in that: the first and second electro-optical switches (3), (12) are positioned anywhere in the ring cavity, and the distance of electro-optical switches is longer than the distance traveled by light during pulse width.

5. The high-efficiency high-power ring laser amplifier according to claim 1, characterized in that: the first and second electro-optic switches (3), (12) use either Pockels cells or other polarization control devices.

6. The high-efficiency high-power ring laser amplifier according to claim 1, characterized in that: the first and second electro-optic switches (3), (12) operate in either a boost mode or a depressurized mode.

7. The high-efficiency high-power ring laser amplifier according to claim 1, characterized in that: the first, second, third and fourth polarizers (1), (8), (10), (17) are either polarizers, or polarization beam splitters, or other polarization components.

8. The high-efficiency high-power ring laser amplifier according to claim 1, characterized in that: the first, second, third and fourth amplifiers (2), (7), (11), (16) are suitable for many different types of gain media, possible gain media include gain media suitable for virtually any solid-state, liquid, or gas laser, and the amplifiers are configured in many pumping configurations.

9. The high-efficiency high-power ring laser amplifier according to claim 1, characterized in that: the first, second, third and fourth amplifiers (2), (7), (11), (16) can be positioned anywhere in the ring cavity and can adjust relevant parameters of the gain medium such as gain, number, length and size so as to meet requirements of output capability.

10. The high-efficiency high-power ring laser amplifier according to claim 1, characterized in that: the wavefront corrector (9) can be replaced with deformable mirror, mirror, adaptive optics or other reflective optical element.

11. The high-efficiency high-power ring laser amplifier according to claim 1, characterized in that: the reflector (18) uses either a reflector, or a deformable mirror, or other reflective optical elements.

* * * * *